No. 789,127. Patented May 2, 1905.

UNITED STATES PATENT OFFICE.

EDWARD GUDEMAN, OF CHICAGO, ILLINOIS.

PROCESS OF MAKING LUMP-STARCH.

SPECIFICATION forming part of Letters Patent No. 789,127, dated May 2, 1905.

Continuation of Serial No. 181,837, filed November 19, 1903. This application filed March 16, 1905. Serial No. 250,361

*To all whom it may concern:*

Be it known that I, EDWARD GUDEMAN, a citizen of the United States, and a resident of Chicago, in the county of Cook and State of Illinois, have invented certain new and useful Improvements in Methods of Making Lump-Starch; and I do hereby declare the following to be a full, clear, and exact description.

In some uses, especially for the laundry, lump-starch is generally held in greater esteem and commands a higher price among consumers than if left in pulverulent or pearl state. To transform these lower grades cheaply and quickly into lump-starch is the object of the present invention.

When starch is obtained from maize, for example, it is familiar practice to soak the grain in water and after cracking the kernels by grinding to immerse the mass in a high gravity, *e. g.*, starch solution for release of the plumules or germs, which rise to the top and float away. Freed from its germs, the residue is finely reground, and after sieving in the presence of a copious water-supply to abstract the bulk of the fiber the residue is run with the water over a series of shallow tables or gutters, upon which the starch-granules settle, while the associated gluten and the fiber remnant pass off as tailings. Removed from the runs or gutters in ordinary course, the starch mass contains about fifty per cent. of water, but is quite ready for treatment according to the improved method on simple reduction of the content of water, say, to about thirty per cent. This is readily accomplished by spreading out the starch on suitable trays in the open air or else more quickly by exposing the loaded trays in a drier to an air-current heated, say, to 180° Fahrenheit. At the close of a few hours, dependent upon the heat and volume of the circulating air, the starch will be robbed of its excess moisture, as desired. By admixing a minor volume of dry starch-powder, which ordinarily carries about fourteen per cent. water, the same result is achieved without need of any special drying. In either way the starchy mass, although still wet to the touch, is at once charged into a suitable vessel and under constant stirring to promote homogeneity is heated there, say, for two hours at, *e. g.*, 180° Fahrenheit. An ordinary mixing-machine with means for heating its contents— *e. g.*, the well-known steam-jacketed device in common use—will serve for the vessel. Minor quantities of the starch-cells are broken down by the heat and moisture, coating the cell-membranes with minute particles of starch, which become incipiently gelatinized, and thus serve as a binder for the mass. The presence of a binder intimately disseminated throughout the mass permits cohesion to quickly take place later on without high or protracted pressure. After heating long enough to barely start gelatinization the charge is promptly withdrawn from the vessel and quickly filled into the usual molds or cylinders, where it is left to set. A gentle pressure—*e. g.*, ten to twenty pounds per square inch—applied either at intervals while the filling goes on or else just after it is finished serves to compact the charge and bring the gelatinized binder into close contact with the starch particles. By fastening the common wooden follower to place at the top of the mold the contents are held confined and the mold can be moved aside to make way for the next. After several hours the binder becomes set, so that the starch leaves the mold as a hard cake to be broken up in ordinary fashion and thereafter promptly dried in the familiar kilns, at about 100° Fahrenheit, until the watery content is reduced to some fourteen per cent. The finished material is then ready to be packed for the market. Should the water content of the crude starch much exceed thirty per centum, it presents a needless surplus to be gotten rid of later on. Besides, the water excess penetrates the starch-cells more deeply, and thereby causes a greater gelatinization than is requisite. These considerations incline the operator to reduce the water percentage at the outset before incipient gelatinization is attempted. Again, when moist starch is heated, *e. g.*, at 170° to 180° Fahrenheit, the starch-cells break down, although not so readily nor so copiously as when the temperature ranges higher. Hence the process is kept under better control at the low degree during thorough admixture of the charge. Should the water content of the batch fall much below thirty per centum, lactic fermentation is apt to develop, imparting a disagreeable odor and tinge to the finished product. At the same time if the prepared batch be charged hot into the molds this risk is minimized, so that by care it becomes entirely feasible to work with a low content of water—e.g., twenty per centum (20%)—calling for but little drying to be done after the lump-starch leaves the molds and is broken up for the packing-trays. The small quantity of binder-starch incipiently gelatinized *in situ* remains semiliquid while hot, but hardens on cooling, so as to completely unite the whole mass of charge in intimate contact therewith.

Instead of taking starch from the runs or gutters, it is quite feasible to employ dry starch-powder suitably moistened so as to contain, e. g., say, thirty per cent. of water at the time it is being heated and incipiently gelatinized. Where stock available can be taken directly from the runs or gutters, the dry waste starch is used to better advantage in admixture therewith to quickly reduce the water content.

The foregoing variations in detail and others of similar sort may be easily effected by persons skilled in the art without material departure from the invention. Degrees of heat, proportions, and duration of treatment as hereinbefore stated are given for greater clearness to more fully explain the preferred practice and are not to be taken as in limitation.

Having thus described my invention, what I claim as new, and desire to secure by Letters Patent, is—

The method of preparing lump-starch which consists in simultaneously stirring and heating the damp batch of starch granules or powder at a temperature proper to effect incipient gelatinization of the starch particles *in situ*, compacting the hot charge into the usual molds and after the charge has set to form a hard cake, breaking the cake into lumps, upon removal, and slowly drying the lumps under kiln heat to remove superfluous moisture, substantially as described.

EDWARD GUDEMAN.

Witnesses:
JAMES H. PEIRCE,
KATHARINE GERLACH.